United States Patent [19]
Bauchet

[11] 3,990,235
[45] Nov. 9, 1976

[54] HYBRID VEHICLE WITH HYDROSTATIC TRANSMISSION AND HYDROPNEUMATIC POWER RESERVE

[75] Inventor: Pierre Bauchet, Annecy, France

[73] Assignee: Societe Nouvelle de Roulements, Annecy, France

[22] Filed: May 29, 1975

[21] Appl. No.: 583,540

[30] Foreign Application Priority Data
May 31, 1974 France .............................. 74.18950

[52] U.S. Cl. .................................. 60/413; 60/418; 60/427; 60/452; 60/483
[51] Int. Cl.² ...................... F15B 1/02; F15B 11/16; F16H 39/46
[58] Field of Search ............. 60/413, 414, 418, 423, 60/425, 427, 433, 445, 452, 483, 484, 489, 493; 180/44 F

[56] References Cited
UNITED STATES PATENTS

| | | | |
|---|---|---|---|
| 900,342 | 10/1908 | Ashley | 60/418 |
| 1,349,924 | 8/1920 | Swanson | 60/483 |
| 3,123,975 | 3/1964 | Ebert | 60/483 X |
| 3,828,555 | 8/1974 | Capdevielle | 60/427 X |
| 3,892,283 | 7/1975 | Johnson | 60/413 X |

*Primary Examiner*—Edgar W. Geoghegan
*Attorney, Agent, or Firm*—Fleit & Jacobson

[57] ABSTRACT

The invention relates to a hybrid vehicle of the hydrostatic transmission type comprising a main driving engine, a hydraulic, variable volumetric capacity pump driven from said main engine, a hydraulic motor and a hydropneumatic power accumulator mounted in a delivery conduit of said pump. Said vehicle further comprises an auxiliary hydraulic motor hydraulically mounted in parallel relationship to said first hydraulic motor and having a common output shaft therewith, the volumetric capacity of said auxiliary motor being equal to one fraction of the volumetric capacity of said first hydraulic motor.

13 Claims, 9 Drawing Figures

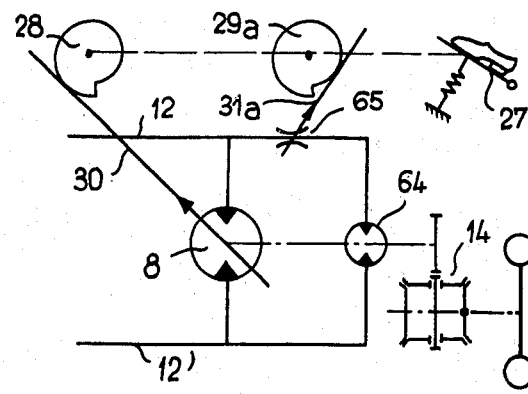
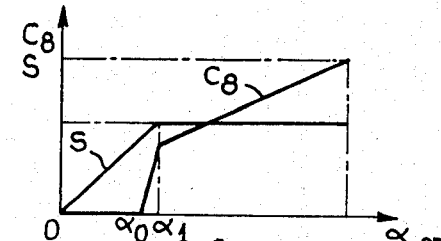
Fig. 6
Fig. 7
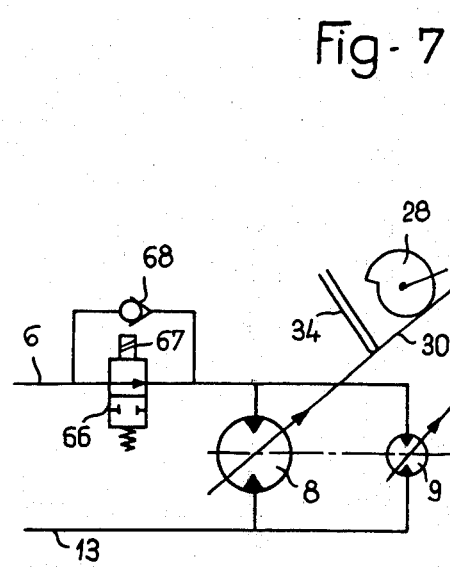
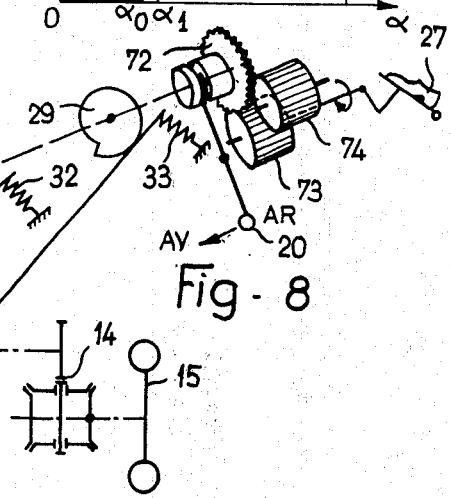
Fig. 8
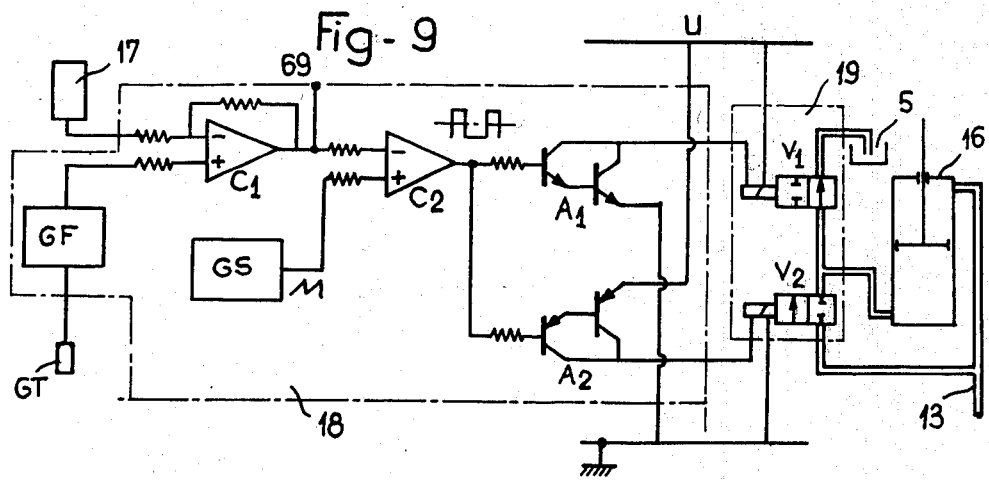
Fig. 9

HYBRID VEHICLE WITH HYDROSTATIC TRANSMISSION AND HYDROPNEUMATIC POWER RESERVE

This invention relates in general to hybrid vehicles of the type having two power units comprising both a low-power motor and a reversible power accumulator capable of delivering a relatively high power during a relatively short time period.

These vehicles are usually criticized for their inherent difficulty in regulating and controlling the thermal engine. On the other hand, these vehicles are advantageous on account of their low fuel consumption as a result of the recovery of otherwise wasted power when slowing down or decelerating, and if a thermal engine is used the latter can operate at a substantially constant rate. In addition, this type of vehicle is characterized by considerably improved pick-up properties in comparison with those characterizing a conventional vehicle equipped with the same thermal engine.

Hybrid vehicles comprising a hydrostatic transmission and a reserve of hydropneumatic power are already known (cf. Product Engineering, October 1973 issue: Lecture on Denver Transports given in September, 1973). In vehicles of this type the output is delivered to a hydropneumatic accumulator and thus energy is stored when the output of the transmission pump exceeds the output absorbed by the hydraulic motor. This energy is returned in the form of an output delivered to the hydraulic motor when the pump output is lower than the hydraulic motor output. Power can be recovered when applying the brakes by reversing the direction of flow of the hydraulic motor output, so that this motor will operate as a pump feeding the hydropneumatic accumulator.

The reliability and driving comfort of a vehicle of this character depend on the specific nature of the engine regulating means and also on the controls for accelerating and braking the vehicle.

It is known that the hydraulic motor of a hybrid vehicle having a hydrostatic transmission is so calculated that its maximum power output substantially equals the power required for braking the vehicle, this last-mentioned power being as a rule and at least four times the rated power in the case of a conventional vehicle.

Consequently, the volumetric capacity of the hydraulic motor is variable and its minimum value corresponds to a relatively high minimum output torque, thus creating a braking problem. In commercial systems a conventional solution brought to this problem consists in providing a variable throttle in series with the hydraulic motor so as to ensure a gradual starting thereof. However, this solution is objectionable in that it implies appreciable power losses.

It is the essential object of the present invention to provide an improved arrangement for a hybrid vehicle comprising a hydrostatic transmission and a hydropneumatic accumulator, such as to afford a simplified and safer driving of the vehicle, and notably obtain a gradual get-away of the vehicle and starting of the hydraulic motor incorporated in the vehicle.

The hybrid vehicle according to this invention, which comprises a hydrostatic transmission, a main driving engine, a variable-capacity hydraulic pump driven from said main driving engine, first and second hydraulic motors mounted in hydraulic parallel relationship and a hydropneumatic power accumulator mounted in a delivery conduit of said pump, is characterised essentially in that both hydraulic motors have a common and same output shaft and that the volumetric capacity of the second hydraulic motor is equal to one fraction of the volumetric capacity of the first hydraulic motor.

Other features and advantages of the present invention will be better understood as the following description proceeds with reference to the attached drawings illustrating diagrammatically by way of example various forms of embodiment of the invention. In the drawings:

FIG. 6 is a diagrammatic view of a modified embodiment of the device of FIG. 2;

FIG. 7 is a diagram illustrating the evolution of the volumetric capacity of the hydraulic motors of FIG. 6 as a function of the movements of the accelerator pedal;

FIG. 8 is a fragmentary diagram showing a modified form of embodiment of the device illustrated in FIG. 2, and FIG. 9 is a diagram illustrating the structure of an electronic computer and the servo means associated therewith for controlling the volumetric capacity of the pump.

Figure 1:
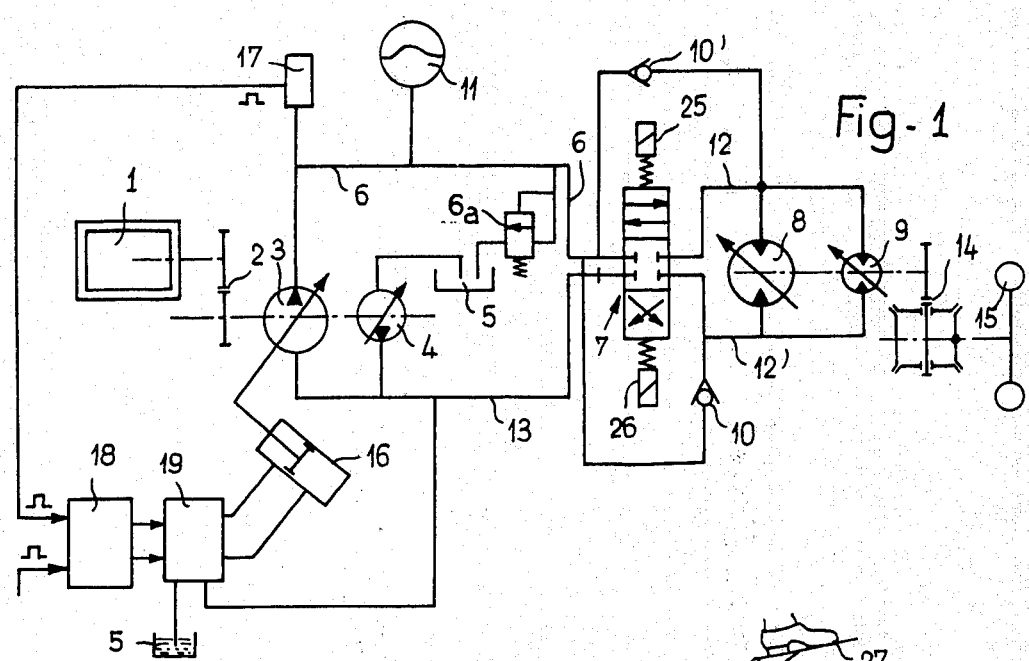
FIG. 1 is a diagrammatic illustration of a typical form of embodiment of a hybrid vehicle transmission according to this invention.

Referring first to FIG. 1, there is shown diagrammatically a main driving engine 1 (for instance an electric motor or an internal combustion engine) driving via a train of gears 2 a variable-capacity hydraulic pump 3 having its suction port forced-fed by a pressure holding pump 4 drawing hydraulic fluid from a reservoir 5. The variable-capacity pump 3 delivers hydraulic fluid into a high-pressure pipe line 6 which, through a solenoid operated reversing valve 7 having a neutral position feeds a first hydraulic motor 8 and an auxiliary hydraulic motor 9, these two motors 8, 9 being mounted in parallel. A non-return valve 10 connected in parallel to said solenoid operated valve 7 prevents the flow of hydraulic fluid in the direction from pump 3 to motors 8, 9, but may permit this circulation in the opposite direction. A non-return valve 10' mounted in parallel to solenoid operated valve 7 is provided for force-feeding the first motor 8 from pump 4 when said first motor 8 operates as a pump. A hydropneumatic accumulator 11 is branched off the high-pressure pipe line 6. According to the position of said solenoid operated valve 7, the pipe line 6 may deliver fluid either into pipe line 12 (forward-motion operation of the vehicle) or into pipe line 12' (reverse-motion operation of the vehicle). The common output shaft of said hydraulic motors 8 and 9 drives via a bevel pinion the input crown wheel of a differential 14 of which the output shafts drive the road wheels of the vehicle, as shown diagrammatically at 15. A pressure sensor or pick up 17 branched off said pipe line 6 measures the pressure in accumulator 11 and delivers an electric signal to an electronic computer 18 of which a typical embodiment will be described presently.

This electronic computer 18 is also fed with one or a plurality of electric signals from one or more probes, pick ups or sensors measuring variable parameters determining the momentary condition of operation of the vehicle (relative speed, position of the accelerator pedal and of the brake pedal, etc . . . ).

The output signals from computer 18 are fed to an electro-hydraulic control unit 19 supplying a differential cylinder and piston unit 16 capable of adjusting the volumetric capacity of pump 3 under the pressure of the forced-feed pump 4. A safety valve 6a avoids any overpressure in the line feeding the hydraulic motors.

Figure 2:
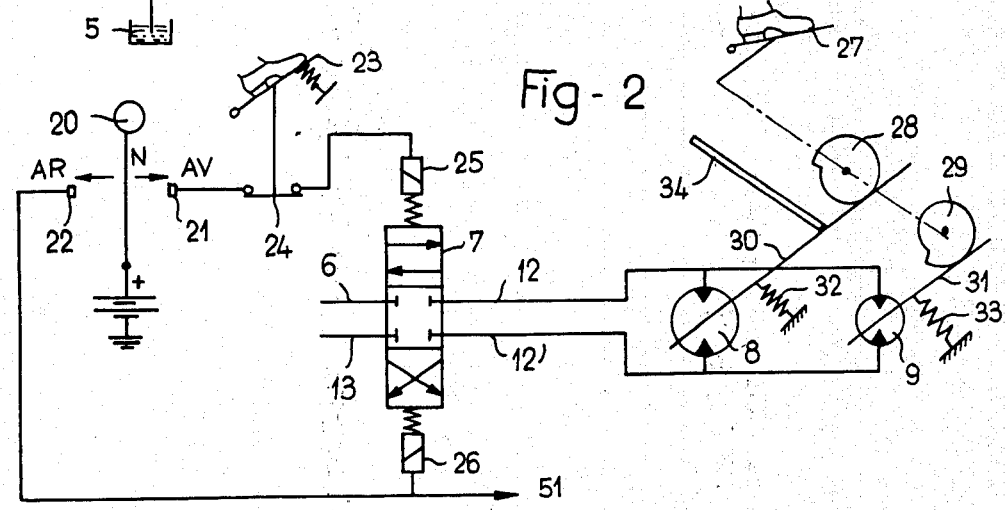
FIG. 2 is a diagrammatic view of a device for controlling the transmission of FIG. 1.

FIG. 2 illustrates a three-position selector 20 providing forward, reverse and neutral (designated by the symbols AV, AR and N, respectively), this selector of the switch type being adapted to close an electric circuit between the positive terminal of the battery of the vehicle and one of the contact studs 21 or 22 of this selector. The brake pedal 23 is adapted to control the opening of a normally closed contact 24. A pair of electromagnets 25 and 26 energized from said contact studs 21, 22 respectively permit positioning the spool valve of the solenoid operated valve 7 in its two reverse feed distribution positions. The accelerator pedal 27 of the vehicle controls the rotation of a pair of cams 28 and 29 co-acting with members 30 and 31, respectively, tending to keep the contact between said cams 28, 29 and the members 30, 31, respectively.

Figure 4:
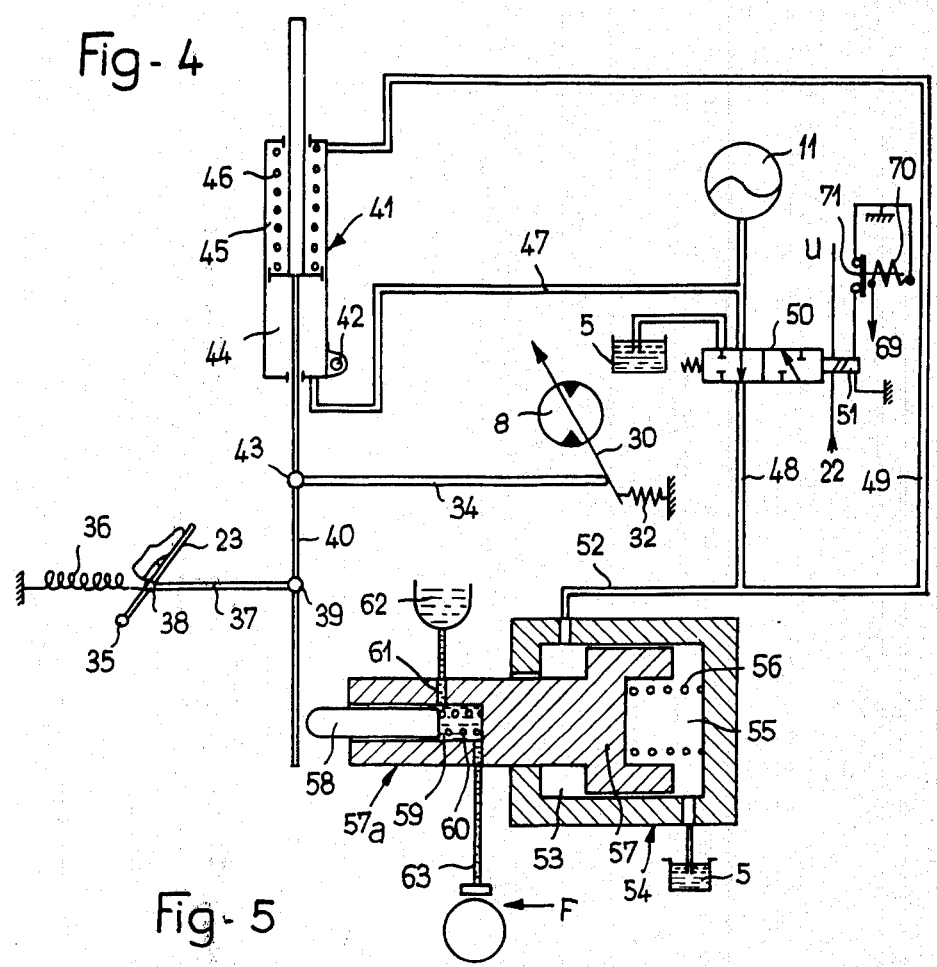
FIG. 4 is a diagrammatic view of a device for controlling the volumetric capacity of a hydraulic motor and the wheel brakes of the vehicle.

Accessorily, a link 34 controlled by the device illustrated in FIG. 4 may also exert a force against member 30, the latter being provided to this end with a spherical recess (not shown) adapted to receive the free end of said link 34.

Figure 3:
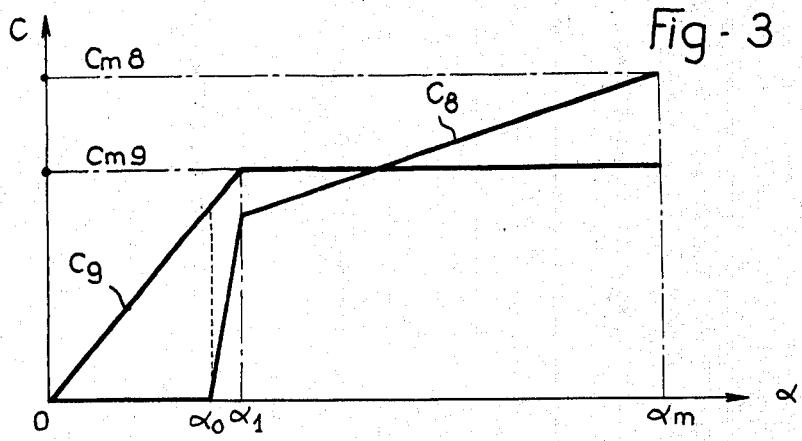
FIG. 3 is a diagram illustrating the evolution of the volumetric capacity of the hydraulic motors as a function of the movements of the accelerator pedal.

FIG. 3 illustrates the variation in the volumetric capacity C of motors 8 and 9 as a function of the position $\alpha$ of the accelerator pedal 27 (curves $C_8$ and $C_9$). Between the zero value 0 and the value $\alpha_0$ of the depression or stroke imparted to this accelerator pedal 27 the change occurs only in the volumetric capacity of motor 9. Then, from $\alpha_0$ to $\alpha_1$, both volumetric capacities change. From $\alpha_1$ up, the volumetric capacity of motor 9 has its maximum value and corresponds to the value $Cm9$ and the volumetric capacity of motor 8 increases until the maximum capacity $Cm8$ is attained, this maximum capacity corresponding to the fully depressed position of the accelerator pedal. The profiles of cams 28 and 29 are selected to produce the above-defined variation in the volumetric capacities of said motors 8 and 9.

FIG. 4 is a basic diagram of the above-mentioned device controlling the volumetric capacity of motor 8 when the brake pedal 23 is depressed. This brake pedal 23 pivots about a fixed fulcrum 35 and is urged to its inoperative position by a traction spring 36. A link 37 is connected by a pivot pin 38 to the brake pedal 23 and by an opposite pivot pin 39 to the rod 40 of a differential cylinder end piston unit 41 of which the body is adapted to pivot about a fixed fulcrum 42. The rod 40 of the piston of unit 41 carries a second pivot pin 43 to which the link 34 is pivoted at one end, the opposite end of this link 34 being adapted to move the member 30 controlling the volumetric capacity of motor 8.

The differential cylinder and piston actuator 41 comprises a first chamber 44 of relatively large diameter and a second chamber 45 of relatively smaller cross-sectional area, which contains a coil compression spring 46. The first chamber 44 of actuator 41 is supplied with hydraulic fluid via a pipe line 47 under the pressure prevailing in accumulator 11. The other, smaller chamber 45 is supplied via pipe lines 48 and 49 either under the pressure prevailing in accumulator 11 or under the pressure existing in reservoir 5, according to the position of the valve or spool member of a solenoid operated valve 50 of which the energizing coil is shown at 51 in FIG. 4. This coil 51 is energized under the control of the above-mentioned computer 18, so that when the output signal from computer 18 is zero the coil 51 is energized.

The above-mentioned pipe line 48 is also adapted to supply fluid under pressure via a pipe line 52 the first chamber 53 of an auxiliary cylinder and piston actuator 54 of which the second chamber 55 contains a compression spring 56 and communicates with the fluid reservoir 5. The piston 57 of actuator 54 constitutes the body 57a of the master cylinder of the wheel brake system of the vehicle. The piston 58 of this master cylinder provides a chamber 59 containing a spring 60 and having formed through its wall a fluid inlet port 61 connected to a reservoir 62 of fluid under pressure, and an outlet line 63 connected to the wheel brake cylinders of the vehicle, shown in diagrammatic form at F.

Figure 5:
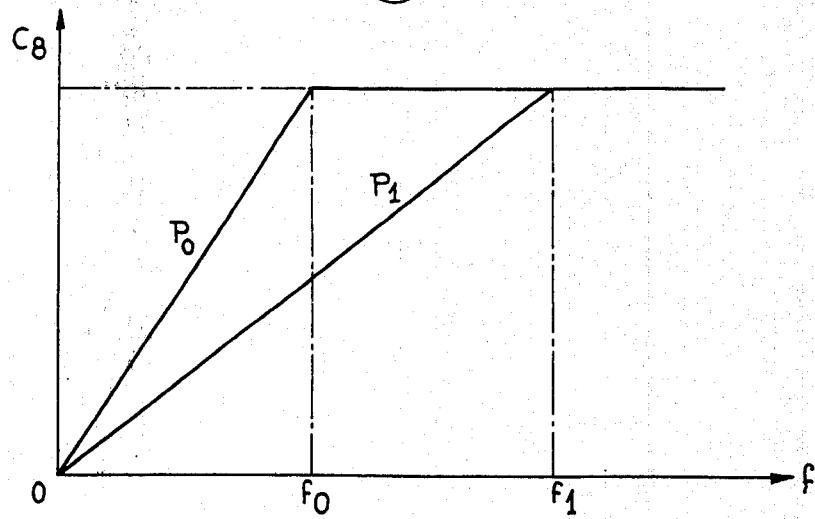
FIG. 5 is a diagram illustrating the evolution of the volumetric capacity of the hydraulic motor of FIG. 4 as a function of the effort exerted by the driver on the brake pedal and also of the hydraulic pressure existing in the accumulator.

FIG. 5 illustrates the evolution of the volumetric capacity of motor 8 as a function of the effort $f$ exerted on the brake pedal 23 and for two positions $P_1$, $P_0$ such that $P_0 < P_1$, in the accumulator 11 connected as shown in the diagram of FIG. 4.

FIG. 6 is a modified embodiment of the construction wherein the variable capacity motor 8 is mounted to the same shaft as an auxiliary hydraulic motor 64 having a constant volumetric capacity and disposed hydraulically in series with a variable throttle 65, this last-mentioned assembly being connected hydraulically in parallel with motor 8. The accelerator pedal 27 is also in this case adapted to control through a cam 28 the member 30 controlling in turn the volumetric capacity of motor 8, and through a cam 29a a member 31a controlling in turn the throttle 65.

FIG. 7 illustrates as a function of the movements $\alpha$ of the accelerator pedal 27 the variation in the cross-sectional passage area S of said throttle 65 and the variation in the volumetric capacity $C_8$ of motor 8 in the case illustrated in FIG. 6. Between the value 0 and the value $\alpha_0$ of the stroke imparted to the accelerator pedal, the cross-sectional passage area S increases gradually. Then, between $\alpha_0$ and $\alpha_1$, the cross-sectional passage area S increases up to its maximum value in conjunction with a rapid increment in the volumetric capacity of motor 8. Subsequently, for any accelerator pedal strokes beyond $\alpha_1$, the volumetric capacity of motor 8 increases up to its maximum value obtained when the accelerator pedal is depressed home. From a comparison between this diagram and that of Fig. 3, it will be seen that the action produced by the combination of members 64 and 65 is equivalent to that obtained with the variable-capacity motor 9.

FIG. 8 relates to a modified embodiment of the device illustrated in FIG. 1, in which the motors 8 and 9 are of the reversible output type. In other words, the output shafts of these motors can rotate in one or the other direction according to the volumetric capacity of these motors when they are supplied with a fluid output fed in a constant direction.

If the output shaft rotates in a constant direction, the output will take place in one or the other direction according to the value of the motor volumetric capacity. In FIG. 8, it will be seen that a electromagnet solenoid operated valve 66 controlled by means of an electromagent 67 is inserted in conduit 6, and that a non-return valve 68 is mounted in parallel to this valve.

FIG. 9 illustrates a possible modified form of embodiment of the electronic computer 18 and electro-hydraulic unit 19.

A tachometric generator GT driven at a velocity proportional to the vehicle speed delivers a certain voltage of which the output signal is compared with the output signal delivered by the pressure sensor 17 in a first differential amplifier $C_1$ acting as a substractive element. Another differential amplifier $C_2$ also acting as a comparator receives the output signal from the first amplifier $C_1$ and the output signal of a sawtooth signal generator GS. It may be noted that the function generator GF delivers an output signal even when the aforesaid function generator GF is inoperative.

The output signal from the second amplifier $C_2$ is amplified selectively according as it is positive or negative by the transistorized power amplifiers $A_1$ and $A_2$, respectively.

Control current is supplied by amplifier $A_1$ to the coil of a solenoid operated valve $V_1$ and by amplifier $A_2$ to the coil of another solenoid operated valve $V_2$.

The output signal from the first differential amplifier $C_1$ is also utilized for controlling the coil 51 of solenoid operated valve 50 (see FIG. 4). To this end, a terminal 69 on computer 18 and a voltage-threshold auxiliary relay 70 having a back contact 71 are provided.

The solenoid operated valves $V_1$ and $V_2$ are two-way valves. Valve $V_2$ receives one pressure from pipe line 13 supplying likewise pressure fluid to the chamber of reduced cross-sectional area of differential actuator 16. The output of this solenoid operated valve $V_2$ is directed to the large diameter chamber of adjustment actuator 16 and is also connected to the input of valve $V_1$ having its output connected to reservoir 5.

A vehicle equipped with the above-described arrangement operates as follows:

If the engine 1 is of the internal combustion type, it may be run at a substantially constant velocity in order to reduce noise and pollution.

The power stored in the accumulator is constantly an increasing function (assuming that the heat exchanges between the accumulator and the surrounding atmosphere can be disregarded) of the fluid pressure in this accumulator.

The service pressure of accumulator 11 varies between two limit values, the maximum value being determined by the mechanical strength of the accumulator (and varies in practice between 300 and 500 bars). The accumulator is pre-inflated at the minimum service pressure.

Four forward-motion phases and two reverse-motion phases of the vehicle will be discussed hereinafter in this order:

Forward motion:
Starting phase (FIGS. 1, 2 and 3):

It is assumed that the main motor or engine 1 revolves at a constant velocity. When starting this motor, the selector 20 is of course in the neutral position N. Both electromagnets 25 or 26 are de-energized. The spool valve of solenoid operated valve 7 is in the neutral position illustrated in FIGS. 1 and 2. The pump 3 loads accumulator 11 until the pressure therein attains a so-called equilibrium value, when the signal delivered by the sensor 17 has the same value as the output signal of function generator GF; thus, the volumetric capacity of the pump is zeroed automatically since the computer 18 delivers a zero error signal.

When the selector 20 is moved to the forward motion position contact stud 21, the brake pedal 23 and accelerator pedal 27 being inoperative, contact 24 is closed and the volumetric capacities of motors 8 and 9 are zero. Due to the action of the electromagnet 25, the solenoid valve 7 is so positioned that pipe lines 6 and 12, on the one hand, and 13 and 12', on the other hand, communicate with each other. It may be reminded that the torque delivered by a hydraulic motor such as 8 is given by the relationship:

$$C = CyM \cdot P$$

wherein
 $CyM$ is the volumetric capacity of the motor, and
 $P$ the supply pressure (here in pipe line 12).
This definition is valid only beyond the volumetric capacity necessary for properly starting the motor, which is the so-called "irreversibility volumetric capacity". For values lower than this volumetric capacity the torque is very low and unstable, and depends notably on the velocity of rotation of the motor. This volumetric capacity corresponds substantially to one-fourth of the maximum cubic capacity of the motor.

Consequently, assuming that the motor 8 is dimensioned with a view to provide a maximum acceleration torque equal to C $max$, the minimum acceleration torque will be C $max$/4, assuming that the pressure is constant.

The volumetric capacity of the variable capacity motor 9 is such that its maximum volumetric capacity is substantially equal to the irreversibility capacity of motor 8.

Therefore, the vehicle is started by controlling the volumetric capacity of motor 9 by means of cam 29. The vehicle starts gradually from rest under the action of the torque delivered by the motor 9 or the assembly of motors 8 and 9, due to the simultaneous control action exerted by the two volumetric capacities responsive to cams 28 and 29.

Driving the vehicle at a stabilized velocity
When the pressure in accumulator 11 is stabilized, to each position of the accelerator pedal 27 there corresponds an output torque on the shaft of hydraulic motors 8 and 9. Therefore, the velocity of the vehicle is controlled by the accelerator pedal as long as the power necessary for driving the vehicle is below the maximum power output of the primary motor or engine 1.

Acceleration
Two different acceleration modes may be contemplated: on the one hand a moderate acceleration requiring a power output lower than the maximum power output of the primary motor or engine 1, and a strong acceleration requiring a power output greater than the maximum power output delivered by said primary engine 1.

Referring to FIG. 3, the moderate acceleration corresponds to the pedal stroke or depression from 0 to $\alpha_0$. The increment in the total volumetric capacity of motors 8 and 9 is small. The increment in the output absorbed by the hydraulic motors is supplied by pump 3 of which the volumetric capacity increases as a consequence of the action exerted by the cylinder and piston actuator 16 controlled automatically as a result of a reduction in the signal measured by sensor 17 following drop in the accumulator pressure.

In the second mode corresponding to a strong increment in the total volumetric capacity of motors 8 and 9, the increment in the output absorbed by the hydraulic motors cannot be supplied entirely by the pump, as the latter has a limited volumetric capacity. Consequently, the accumulator pressure continues to drop and this accumulator delivers an output to the hydraulic motor and provides additional power to the vehicle.

Braking

It may be reminded that the selector member 20 is in the "forward motion" position, i.e. with electromagnet 25 energized. If, having released the accelerator pedal 27, the driver depresses the brake pedal 23, contact 24 will open, thus discontinuing the energization of electromagnet 25 and causing the spool or valve member of solenoid operated valve 7 to resume its neutral position shown in FIGS. 1 and 2. As shown in FIG. 4, the arrangement is such that this brake pedal 23 controls only the first motor 8, the other hydraulic motor 9 remaining in its zero volumetric capacity condition due to the release of accelerator pedal 27. In the neutral position of solenoid operated valve 7, the motor 8 is not supplied with high-pressure fluid, and as a consequence of its driving connection with the wheels of the vehicle, its direction of rotation remains unchanged, so that this motor will operate as a pump; consequently, it is force-fed from pump 4 via non-return valve 10' and its output is delivered via non-return valve 10 to accumulator 11.

Moreover, as illustrated in FIG. 5, the action of brake pedal 23 modifies the volumetric capacity of motor 8, this capacity being regulated by the pressure prevailing in said accumulator. In fact, it is desirable that the braking torque produced by this hydraulic motor 8 depends only on the force applied by the driver on the brake pedal. The braking torque is expressed as $C = P \cdot CyM$ ($P$ being the pressure in pipe line 12', and $CyM$ the volumetric capacity of the hydraulic motor). Therefore, the product $P \cdot CyM$ should be substantially constant for a given force applied to the brake pedal, irrespective of the pressure prevailing in the accumulator, i.e. the higher the pressure, the lower the volumetric capacity. This is illustrated in FIG. 5 showing a law of evolution of the volumetric capacity of the motor as a function of the effort $f$ exerted on the brake pedal for two pressures $P_0$ and $P_1$ in the accumulator, $P_0 < P_1$. It will be seen that with a pressure $P_0$ the maximum volumetric capacity is attained when said effort if $f_0$.

Now reference will be made to FIG. 4 for describing the manner in which the volumetric capacity of motor 8 is regulated as a function of the pressure in accumulator 11.

Now let us assume that the pressure in accumulator 11 is such that the signal delivered by sensor 17 is lower than the output signal of the function generator GF; coil 51 is deenergized for the computer 18 delivers a signal to terminal 69, whereby relay 70 is energized and contact 71 open, i.e. the spool member of solenoid operated valve 50 is in the position shown in this diagram. Consequently, both chambers 44 and 45 of actuator 41 are at the same pressure as accumulator 11. Now, let us assume that a force $f_0$ is exerted by the driver on the brake pedal 23. This will set the rod 40 in a given angular position and the actuator will pivot about a fixed fulcrum 42 through an angle substantially proportional to said force $f_0$. On the other hand, the distance between the pivot pin 43 and the fixed fulcrum 42 decreases when the pressure P in accumulator 11 increases, the differential pressure effect being actually compensated by the compression of spring 46. Since link 34 has one end pivoted at 43 and the opposite end engaged against the volumetric capacity adjustment member 30, the volumetric capacity is substantially proportional to the force $f_0$ and inversely proportional to P. Therefore, this device meets the requirement concerning the proportionality between the hydraulic motor torque and the effort exerted on the brake pedal.

Another function performed by the device of FIG. 4 is the automatic actuation by the brake pedal 23 of the wheel brakes F of the vehicle when the braking force demanded by the driver exceeds the maximum braking power available by regeneration; in fact, the maximum regenerative braking power is obtained when the motor 8 operates as a pump at its maximum volumetric capacity. For each accumulator pressure, there is consequently a given force to be exerted on the brake pedal (FIG. 5) or an angular position of rod 40 (FIG. 4) such that the maximum regenerative braking power is attained. If the force applied to the brake pedal exceeds that corresponding to the maximum regenerative braking power, the brake system controlling the wheel brakes of the vehicle must be implemented or operated.

When the spool valve of solenoid operated valve 50 is in the position illustrated in FIG. 4, the chamber 53 of actuator 54 is fed with fluid under pressure from accumulator 11. Therefore, the position of equilibrium of piston 57 depends on the pressure prevailing in said accumulator 11. When the pressure in accumulator 11 is relatively low, the piston rod 40 of actuator 41 is in its lowermost position, pistons 57 and 58 are moved to the left and it will be assumed that when no force is applied to the brake pedal 23 the piston 58 does not contact the rod 40. A light force applied to the brake pedal will produce a small angular movement of piston rod 40 to control the maximum volumetric capacity of motor 8, and this piston rod 40 will also engage piston 58. If the force applied to the brake pedal 23 increases and the pressure in accumulator 11 remains constant, the rod 40 will move angularly, thus exerting a force on piston 58 and creating a pressure in chamber 59 and also in the brake control pipe line 63. When a relatively high pressure prevails in accumulator 11, the rod 40 is in its uppermost position and pistons 57 and 58 are shifted to a position somewhat off-set to the right with respect to the position illustrated in FIG. 4. Thus, a relatively great force must be exerted on the brake pedal 23 to obtain the maximum volumetric capacity of motor 8 (FIG. 5) and cause the rod 40 to engage piston 58, so as to apply also the wheel brakes.

Now let us assume that a force is exerted on brake pedal 23 and that the pressure built up in accumulator 11 is substantially equal to the pressure of equilibrium; under these circumstances, the signal delivered by the computer to terminal 69 being zero, the coil 51 is energized with a voltage U via contact 71 now closed. The spool valve of solenoid operated valve 50 is moved to the left in relation to the position shown in FIG. 4. Thus, chambers 45 of actuator 41 and 53 of actuator 54 are caused to communicate with reservoir 5. The piston of actuator 41 is now in a state of unbalance and will abut the bottom of chamber 45. The piston rod 40 rises and the movable pivot pin 43 approaches the fixed fulcrum 42, thus zeroing the volumetric capacity of motor 8, irrespective of the angular position of said rod 40. Piston 57 is also put in a state of unbalance and is positioned in abutment in the bottom of chamber 53. By construction, it is provided that the position of equilibrium of piston 58 is now such that it will engage the rod 40 when no force is applied to the brake pedal 23.

If the driver keeps depressing the brake pedal 23, the pressure in accumulator 11 attains the maximum permissible value, and the vehicle brakes are applied automatically.

Reverse motion (see FIG. 2)

The selector 20 closes the circuit through contact stud 22, thus energizing the electromagnet 26 and moving the spool valve of reversing valve 7 so that pipe lines 6 and 12', on the one hand, 13 and 12 on the other hand, communicate with each other. Then the vehicle is started in reverse by depressing the accelerator pedal 27, as in the case of the forward motion.

Braking (see FIG. 4)

When reverse motion has been selected, the lever 20 also closes through contact stud 22 the circuit for energizing the coil 51; in other words, the spool valve of solenoid operated valve 50 is moved to the left as seen in FIG. 4 and chambers 45 of actuator 41 and 53 of actuator 54 communicate with the pressure fluid reservoir 5. Therefore, the pivot pin 43 is positioned in the vicinity of the fixed fulcrum 42, thus zeroing the volumetric capacity of motor 8, and piston 57 abuts the bottom of chamber 53 while piston 58 engages the rod 40.

When the brake pedal 23 is depressed the piston 58 exerts a pressure in chamber 59, thus controlling the wheel brakes of the vehicle.

Vehicle operation in the case of the modified embodiment of FIGS. 6 and 8

In the modified arrangement illustrated in FIG. 6, the mode of operation of the vehicle differs only very slightly from that described hereinabove. The accelerator pedal 27 controls operation of the vehicle in this case through cam 29a and during a first phase through the variable throttle 65. The variable loss of pressure thus created in the throttle allows a continuous variation of the torque delivered by the motor 64, and during a second phase the volumetric capacity of motor 8 is modified by means of cam 28.

In the modified embodiment illustrated in FIG. 8, the outputs of both motors 8 and 9 can be directed in opposite direction, as desired.

Since the volumetric capacity of motors 8 and 9 varies on either side of zero value, it will be assumed by convention that one "direction" of "positive" volumetric capacity corresponds to the regenerative power obtained when driving the vehicle forwards or in reverse, and that one "direction" of "negative" volumetric capacity corresponds to the forward motion of the vehicle and could be used for driving in reverse with power regeneration.

By construction, the position of the forward-neutral-reverse selector 20 determines the direction of rotation of cams 28 and 29.

To this end, the camshaft also carries a sliding-gear 72 of which the movements of translation along said camshaft are controlled by the selector 20. The accelerator pedal 7 controls the rotation of a driving pinion 73 meshing with a free rotation pinion 74. Pinions 72, 73 and 74 are mounted on parallel shafts and the sliding gear 72 is adapted to mesh at will with anyone of the other pinions 73 or 74 so that the direction of rotation of cams 28, 29 depends on the selected direction of motion of the vehicle.

Thus, when the driver selects "forward motion", the accelerator pedal controls a predetermined direction of rotation of motors 8 and 9. When the driver selects "reverse" motion, the accelerator pedal controls the other direction of rotation of said motors 8 and 9. When the accelerator pedal is released, the volumetric capacity of motors 8 and 9 is again reduced to zero. The accelerator pedal also actuates a switch (not shown) for energizing the electromagnet 67, this corresponding to the distribution position of the spool valve of the solenoid operated valve 66 which is shown in FIG. 8.

When the driver depresses the brake pedal 23, the rod 34 is actuated (by the device shown in FIG. 4) so that the volumetric capacity of motor 8 has the same direction as the "reverse motion" volumetric capacity. Thus, since the vehicle is driven in forward motion, the direction of the output of motor 8 is reversed; since the accelerator pedal is released during this brake application, the solenoid operated valve 66 is switched to the position opposite that shown in FIG. 8 and the output of motor 8 clears the non-return valve 68 to charge accumulator 11. This non-return valve 68 prevents the vehicle from starting in reverse when it has come to a complete standstill.

Although specific forms of embodiment of this invention have been described hereinabove and illustrated in the accompanying drawings, it will readily occur to those conversant with the art that various modifications and changes may be brought thereto without departing from the scope of the invention as set forth in the appended claims.

What is claimed as new is:

1. A hybrid vehicle having a hydrostatic transmission which comprises a main driving motor or engine, a variable-capacity hydraulic pump driven from said main motor, first and second hydraulic motors mounted in parallel hydraulic relationship, and a hydropneumatic power accumulator mounted in a delivery conduit of said pump, said first and second hydraulic motors having a common output shaft while the volumetric capacity of the second hydraulic motor is equal to one fraction of the volumetric capacity of the first hydraulic motor, an accelerator pedal on the vehicle associated in a first fraction of its stroke with means producing a gradual increment in the torque of said second hydraulic motor and ensuring at the end of said stroke fraction an increment in the torque of said first hydraulic motor, said second hydraulic motor being of the fixed volumetric capacity type associated with a variable throttle disposed in series therewith.

2. A hybrid vehicle having a hydrostatic transmission which comprises a main driving motor or engine, a variable-capacity hydraulic pump driven from said main motor, first and second hydraulic motors mounted in parallel hydraulic relationship, and a hydropneumatic power accumulator mounted in a delivery conduit of said pump, said first and second hydraulic motors having a common output shaft while the volumetric capacity of the second hydraulic motor is equal to one fraction of the volumetric capacity of the first hydraulic motor, an accelerator pedal on the vehicle associated in a first fraction of its stroke with means producing a gradual increment in the torque of said second hydraulic motor and ensuring at the end of said stroke fraction an increment in the torque of said first hydraulic motor, said producing means comprising two cams operatively connected to the accelerator pedal and co-acting with means for adjusting the volumetric capacity of said first and second hydraulic motors.

3. A vehicle as set forth in claim 1 wherein said producing means comprise a pair of cams operatively connected to said accelerator pedal and co-acting one with an adjustment member of said variable throttle and the other with a volumetric capacity adjustment member of said first hydraulic motor.

4. A vehicle as set forth in claim 1 wherein a pressure sensor adapted to produce an electrical output signal is associated with said hydropneumatic accumulator, the electrical output signal from said sensor being adapted to be compared in an electronic computer with an electric signal delivered by a function generator receiving at least one signal proportional to a variable characterising the momentary condition of operation of the vehicle, an output signal from said computer controlling a device for varying the volumetric capacity of said hydraulic pump.

5. A vehicle as set forth in claim 2 wherein a pressure sensor adapted to produce an electrical output signal is associated with said hydropneumatic accumulator, the electrical output signal from said sensor being adapted to be compared in an electronic computer with an electric signal delivered by a function generator receiving at least one signal proportional to a variable characterising the momentary condition of operation of the vehicle, an output signal from said computer controlling a device for varying the volumetric capacity of said hydraulic pump.

6. A vehicle as set forth in claim 1 wherein the brake control member of the vehicle is adapted to co-act on the one hand with a reversing solenoid-operated distribution valve of the first hydraulic motor, so that said first hydraulic motor can load the hydropneumatic accumulator through a non-return valve, the brake control member co-acting on the other hand with a device for varying the volumetric capacity of said first hydraulic motor.

7. A vehicle as set forth in claim 1 wherein said first hydraulic motor is adapted to deliver its output in two opposite directions and the brake control member is adapted to co-act with a device for varying the volumetric capacity of said first hydraulic motor so as to reverse the direction of flow of its output in relation to that responsive to the accelerator pedal, the brake control member further co-acting with a solenoid operated valve adapted to cut off the distribution of fluid under pressure to said first hydraulic motor, a non-return valve for allowing the fluid flow to said accumulator being connected in parallel to said valve.

8. A vehicle as set forth in claim 1 wherein the device for varying the volumetric capacity of said first hydraulic motor comprises a differential cylinder and piston actuator pivoted to a fixed fulcrum pin and having its chambers supplied with fluid under pressure from said accumulator, the chamber having the smallest cross-sectional area having therein a spring, the piston rod being adapted to move angularly about said fixed fulcrum pin under the control of a brake control member, said piston rod having pivoted thereon a rod controlling the volumetric capacity of said first hydraulic motor.

9. A vehicle as set forth in claim 7 wherein the device for varying the volumetric capacity of said first hydraulic motor comprises a differential cylinder and piston actuator pivoted to a fixed fulcrum pin and having its chambers supplied with fluid under pressure from said accumulator, the chamber having the smallest cross-sectional area having therein a spring, the piston rod being adapted to move angularly about said fixed fulcrum pin under the control of a brake control member, said piston rod having pivoted thereon a rod controlling the volumetric capacity of said first hydraulic motor.

10. A vehicle as set forth in claim 8 wherein said accumulator is adapted to supply pressure fluid to the chamber of a cylinder and piston actuator of which the piston constitutes a movable master cylinder, the piston of said master cylinder co-acting with the rod of said differential actuator.

11. A vehicle as set forth in claim 9 wherein said accumulator is adapted to supply pressure fluid to the chamber of a cylinder and piston actuator of which the piston constitutes a movable master cylinder, the piston of said master cylinder co-acting with the rod of said differential actuator.

12. A vehicle as set forth in claim 10 further comprising a solenoid operated switch valve responsive to an output signal from said computer as a function of the pressure prevailing in said accumulator, said solenoid operated valve being adapted to isolate said accumulator and cause said chambers of said actuators to communicate with said fluid reservoir.

13. A vehicle as set forth in claim 11 further comprising a solenoid operated switch valve responsive to an output signal from said computer as a function of the pressure prevailing in said accumulator, said solenoid operated valve being adapted to isolate said accumulator and cause said chambers of said actuators to communicate with said fluid reservoir.

* * * * *